United States Patent
Bowman et al.

(10) Patent No.: US 6,735,439 B2
(45) Date of Patent: May 11, 2004

(54) PSEUDO-GLOBAL TITLE TRANSLATION FOR INTERNATIONAL ROAMING OF ANSI-41 SUBSCRIBERS

(75) Inventors: Philip J. Bowman, Pleasanton, CA (US); Christian Bazinet, Sunnyvale, CA (US)

(73) Assignee: Globalstar L.P., San Jose, CA (US)

( * ) Notice: Subject to any disclaimer, the term of this patent is extended or adjusted under 35 U.S.C. 154(b) by 0 days.

(21) Appl. No.: 10/094,752

(22) Filed: Mar. 11, 2002

(65) Prior Publication Data

US 2002/0137511 A1 Sep. 26, 2002

Related U.S. Application Data

(63) Continuation of application No. 09/489,242, filed on Jan. 21, 2000, now abandoned.

(51) Int. Cl.$^7$ ................................................. H04Q 7/20
(52) U.S. Cl. ................... 455/427; 455/12.1; 455/432.1; 455/433; 455/435.1
(58) Field of Search ............................... 455/12.1, 427, 455/433, 435.1, 445, 432.1, 432.2, 414.1, 560; 379/219, 220.1

(56) References Cited

U.S. PATENT DOCUMENTS

| | | | |
|---|---|---|---|
| 5,655,005 A | 8/1997 | Wiedeman et al. | 370/320 |
| 5,715,297 A | 2/1998 | Wiedeman | 379/60 |
| 5,838,782 A | 11/1998 | Lindquist | 379/230 |
| 5,867,788 A | 2/1999 | Joensuu | 455/445 |
| 5,905,952 A | 5/1999 | Joensuu et al. | 455/433 |
| 5,978,678 A | 11/1999 | Houde et al. | 455/433 |
| 6,009,088 A | 12/1999 | Taguchi et al. | 370/338 |
| 6,064,887 A | 5/2000 | Kallioniemi et al. | 455/445 |
| 6,188,899 B1 | 2/2001 | Chatterjee et al. | 455/435 |

FOREIGN PATENT DOCUMENTS

| | | | | |
|---|---|---|---|---|
| GB | 2280085 A | 1/1995 | | H04Q/7/22 |
| WO | WO 97/38544 | 10/1997 | | H04Q/7/38 |

OTHER PUBLICATIONS

Uchiyama et al. "Network Functions and Signalling for Personal Roaming between Digital Cellular Standard." NTT Mobile Comm., Inc. Pub. No. XP000689991.
International Search Report. PCT App. No. PCT/US01/01283, Filed Jan. 16, 2001.
European Serch Report. European Patent App. No. 01300487.4. Filed Jan. 19, 2001.

*Primary Examiner*—Quochien B. Vuong
(74) *Attorney, Agent, or Firm*—Karambelas & Associates

(57) ABSTRACT

A method is provided for routing a message through a telecommunications network. The method includes receiving an identifying number (eg: a MIN or ESN) from a wireless terminal and prepending at least one character to the identifying number to form a pseudo-global title. The message is then routed through the telecommunications network to a destination determined by the pseudo-global title. Upon arrival at the destination, the method further includes converting the pseudo-global title to a home location register address. The message is then routed to a home location register having the home location register address.

18 Claims, 3 Drawing Sheets

PSEUDO-GLOBAL TITLE TRANSLATION FOR INTERNATIONAL ROAMING OF ANSI-41 SUBSCRIBERS

This is a continuation of application No. 09/489,242, filed Jan. 21, 2000, now abandoned.

FIELD OF THE INVENTION

This invention relates to wireless telecommunications services, and, in particular, to international roaming of wireless terminals.

BACKGROUND OF THE INVENTION

The operation of obtaining service outside of a wireless subscriber's home service area is commonly referred to as roaming. The ability of a subscriber to roam outside of his or her home service area depends on the relationship between the subscriber's home service provider and the service provider in the area being visited. This relationship ideally includes the ability to exchange information between the two systems. In order to provide a consistent exchange of information, with minimal user intervention, the telecommunications industry has developed standard protocols for communications between mobile switching centers, making it possible for roaming subscribers to originate, receive, and maintain calls as they cross system boundaries.

Reference in this regard can be had, by example, to Telecommunications Industry Association Interim Standard 41 (TIA IS-41), also referred to as ANSI/TIA/EIA 41-D-1997 (ANSI-41), entitled "Cellular Radiotelecommunications Intersystem Operations."

ANSI-41 specifies two types of databases to facilitate roaming, the home location register (HLR) and the visitor location register (VLR). The home location register resides with the subscriber's home service provider and contains pertinent information about the subscriber's equipment and the services the subscriber is entitled to. The HLR also contains the current location and status of the subscriber's terminal. Access to the HLR is controlled by the subscriber's mobile identification number (MIN), which is stored in the terminal. The visitor location register (VLR) resides with the system being visited, referred to as the serving system, and contains information, including the MIN and the electronic serial number (ESN), regarding the terminals currently in the serving system service area.

When a terminal enters a serving system, it attempts to register in that system. As part of the registration process, the serving system's mobile switching center (MSC) records information about the terminal, including the terminal's MIN and ESN, in its VLR. The serving system's VLR then attempts to contact the subscriber's HLR for authentication that the subscriber is entitled to access the system.

ANSI-41 wireless networks worldwide use the MIN, mentioned above, to identify their subscribers within their own country. In North America, the MIN is often used as the subscriber's mobile directory number (MDN). ANSI-41 wireless networks in the United States and Canada also use the subscriber's 10 digit MIN to direct messages from the serving system to the subscriber's HLR. While MIN-based routing is generally supported in the ANSI networks of North America, it is not recognized as a valid global address type, also referred to as a title, by the International Telecommunications Union (ITU). As a result, using a subscriber's MIN to locate the subscriber's HLR is not generally supported by networks outside of North America. Thus, a subscriber's MIN is not necessarily a valid global title.

New protocol extensions to ANSI-41 are being developed to provide true global title formats, specifically E.212, however, since the ITU has not yet accepted E212 as an officially sanctioned translation type, the useful application of E.212 is not expected to be available globally for some time.

The International Forum for AMPS Standards Technology (I FAST) has issued unique network codes to operators outside of North America for use as the most significant four digits of their subscribers' MINs. MINs using these special codes are called International Roaming MINs (IRMs). The use of IRMs ensures that a globally unique identification is available for mobile subscribers, and IRMs provide a generally accepted global title for directing a visited system to a subscriber's HLR. The IRM always begins with a "0" or a "1" to ensure that they never conflict with MINs used in North America, as North American MINs never start with a "0" or a "1." While IRMs provide a generally accepted method for designating a subscriber's HLR, North American MINs, because they never begin with a "0" or "1", remain unacceptable as global titles.

These problems are compounded when using a global satellite communications system, such as one shown in U.S. Pat. No. 5,655,005, issued Aug. 5, 1997, entitled "Worldwide telecommunications System Using Satellites", by Robert A. Wiedeman and Paul A. Monte and U.S. Pat. No. 5,715,297, issued Feb. 3, 1998, entitled "Wireless Telephone/Satellite Roaming System", by Robert A. Wiedeman. In a global satellite communications system, a user's terminal is intended to have service anywhere within the coverage area of a satellite system, regardless of international boundaries.

OBJECTS AND ADVANTAGES OF THE INVENTION

It is an object and advantage of this invention to provide a method and apparatus to allow subscribers of ANSI-41 based networks to roam internationally. It is a second object and advantage of this invention to provide a method and apparatus to allow subscribers of ANSI-41 based networks to roam internationally by correctly routing wireless signaling messages from a visited system to a subscribers home network using the terminal's MIN as the initial addressing format. It is a further object and advantage of this invention to provide a method and apparatus to allow subscribers of ANSI-41 based networks to roam internationally in a global satellite communications system.

SUMMARY OF THE INVENTION

The foregoing and other problems are overcome and the objects of the invention are realized by methods and apparatus in accordance with embodiments of this invention.

A method is provided for routing a message through a telecommunications network. The method includes receiving an identifying number (eg: a MIN or ESN) from a wireless terminal and prepending at least one character to the identifying number to form a pseudo-global title. The message is then routed through the telecommunications network to a destination determined by the pseudo-global title. Upon arrival at the destination, the method further includes converting the pseudo-global title to a home location register address. The message is then routed to a home location register having the home location register address.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE PREFERRED EMBODIMENTS

Figure 1:
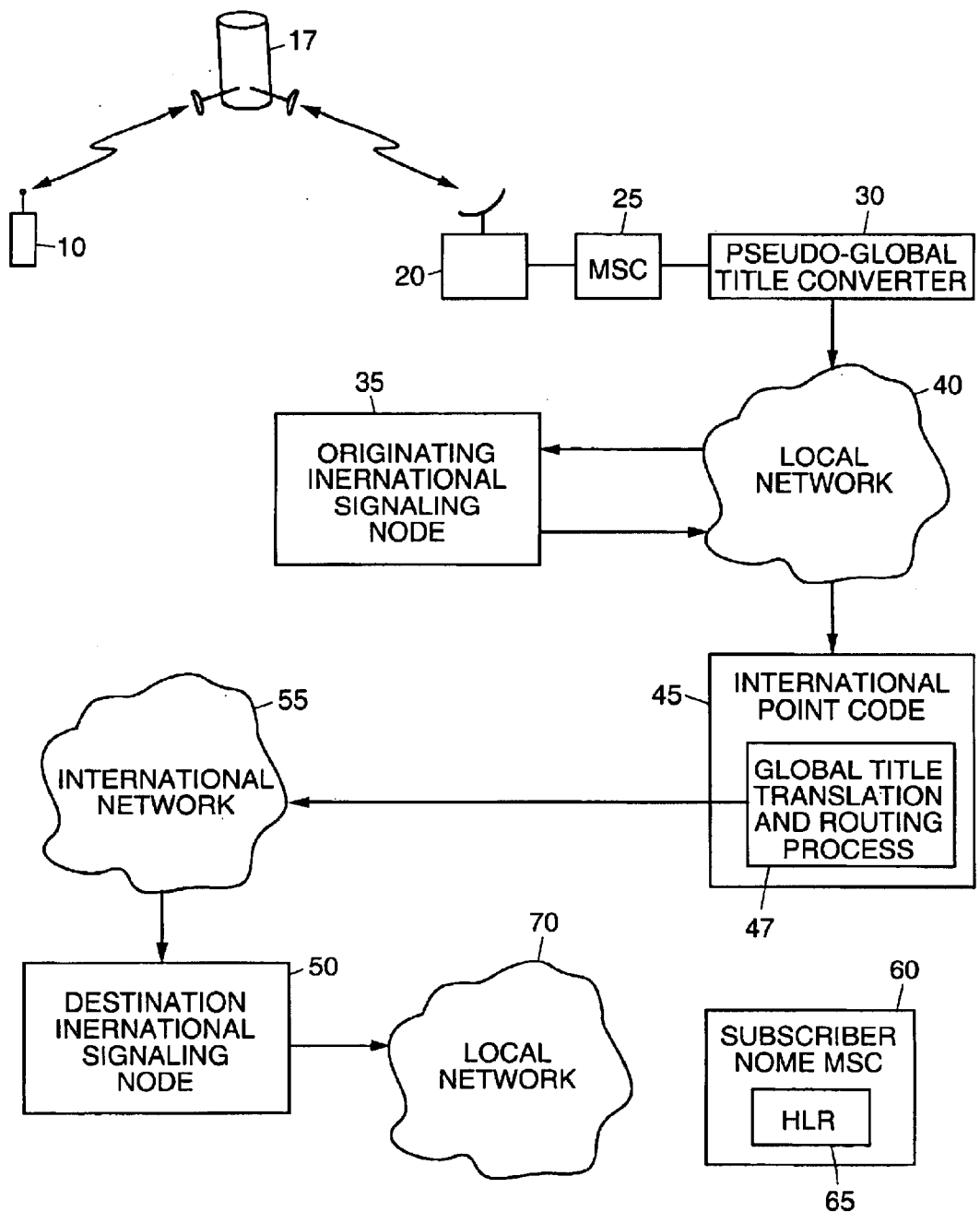
FIG. 1 shows a diagram of a system in which the invention may be practiced.

FIG. 1 shows a network environment that is suitable for practicing this invention. A wireless terminal 10 is shown roaming in a foreign serving network 15. The foreign serving network includes a communications satellite 17, satellite system gateway 20, a mobile switching center 25, and a pseudo-global title translator 30. The pseudo-global title translator 30 is shown for convenience as being a unit coupled between the mobile switching center 25 and an originating international signaling node 35 through a local network 40. The originating international signaling node 35 communicates with an international point code 45, also through the local network 40. The international point code 45 contains a global title translation and routing process 47. The international point code 45 communicates with a destination international signaling node 50 through an international network 55. The destination international signaling node 50 then communicates with the wireless terminal's home subscriber network 60 and the wireless terminal subscriber's HLR 65 through a local network 70. The various aspects of this embodiment are now described in further detail.

Assume first that the wireless terminal 10 roaming on the foreign serving system 15 attempts to register. Upon detecting the presence of the visiting wireless terminal 10, the gateway 20 of the foreign serving system informs the foreign serving system's MSC 25 that it has received a registration message. The MSC 25 then communicates with the pseudo-global title converter 30 as will be described.

Figure 2:
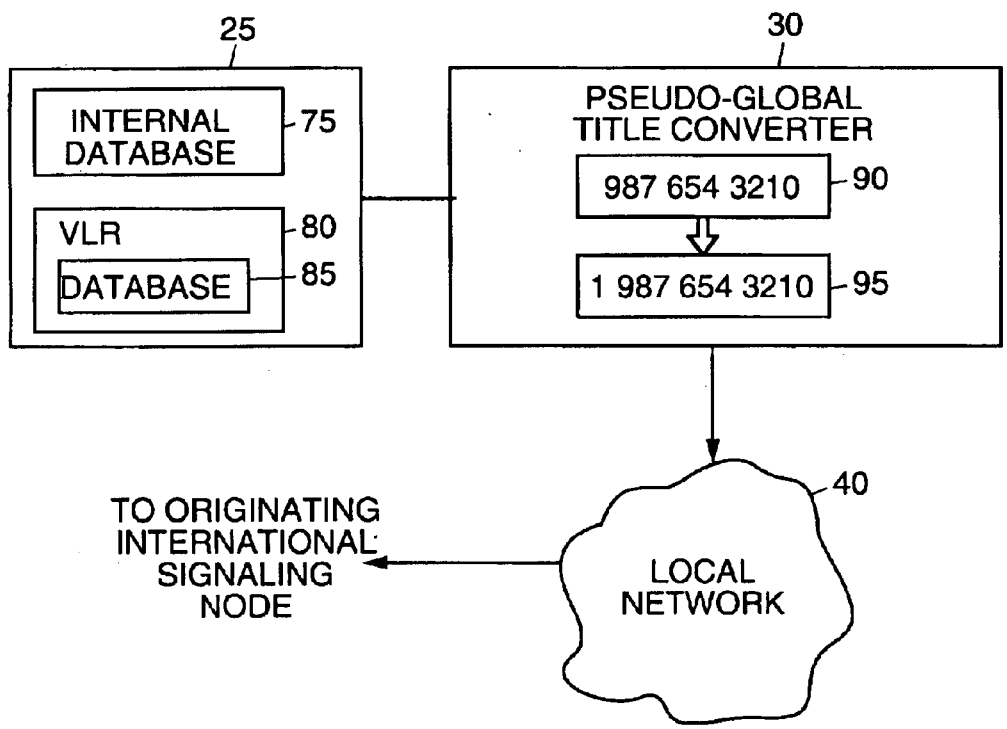
FIG. 2 shows a block diagram of a mobile switching center coupled to a pseudo-global title translator as part of this invention.

Referring first to FIG. 2, there is illustrated in greater detail the MSC 25 and pseudo-global title converter 30. As shown in FIG. 2, the MSC 25 examines an internal database 75 to determine if the wireless terminal 10 is already registered in its service area. If the wireless terminal 10 is not registered, the serving MSC 25 updates the internal database 75 with the information that the wireless terminal 10 is present and sends an IS-41 message containing the MIN and ESN of the wireless terminal 10 to its VLR 80, also referred to as the serving VLR. The serving VLR 80 then determines if the wireless terminal 10 is already registered in its database 85. If not, the serving VLR 80 stores the information and then attempts to contact the wireless terminal's HLR 65 (FIG. 1) for authentication. In order to accomplish this, the serving VLR 80 creates an ANSI-41 roaming signaling message with a destination, or title, based on the wireless terminal's MIN. The title is used to route the message to the wireless terminal's HLR 65. As stated above, MIN-based titles are generally accepted in North America, but not in the rest of the world. In order to accommodate global routing of the roaming signaling message, the pseudo-global title converter 30 is used. The pseudo-global title converter 30 is coupled to the serving VLR 80 from which it receives the ANSI-41 roaming signaling message with its MIN-based title 90. The pseudo-global title converter 30 converts the MIN-based title to a generally accepted E.164 type title 95 by prepending it with a country code of "1." The converted title 95, as generated in accordance with an aspect of this invention, is referred to herein as a pseudo-global title.

It is important to note that any country code or identifier may be prepended to the MIN-based title 90 to create the pseudo-global title 95, as long as the resulting digit string is unique to all international nodes within the system. Based on the pseudo-global title 95, the pseudo-global title converter 30 selects an appropriate originating international signaling node 35. After selecting the appropriate originating international signaling node 35, the pseudo-global title converter 30 functions as a message router, and sends the ANSI-41 roaming signaling message with the pseudo-global title 95 to the originating international signaling node 35 over the local network 40.

Figure 3:
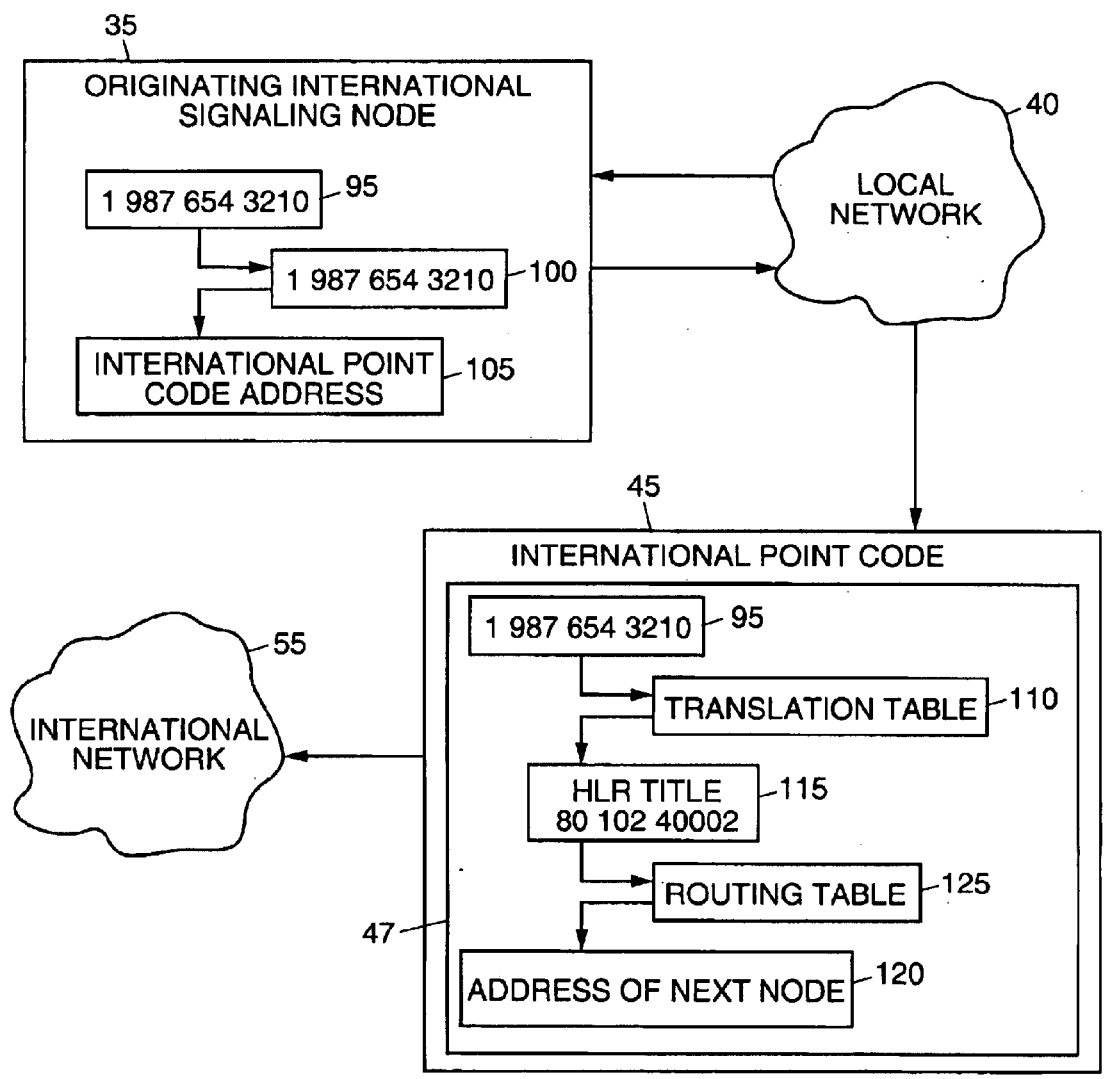
FIG. 3 shows a block diagram of an originating international signaling node and an international point code suitable for practicing the invention.

Referring now to FIG. 3, the originating international signaling node 35 contains a routing table 100 and, using the most significant digits of the pseudo-global title 95 as a key, functions as a message router, routing the message to the international point code 45, as specified by the international point code address 105 in its routing table 100.

At the international point code 45, the global title translation and routing process 47 receives the message. The global title translation and routing process 47 contains a translation table 110 which links pseudo-global titles with the corresponding true E. 164 destination addresses for a subscriber's home network elements, including a subscriber's HLR 65 (FIG. 1). The global title translation and routing process 47 looks up the pseudo-global title 95 in its translation tables 110 and substitutes the true E. 164 destination title 115 for the subscriber's HLR 65 as the new destination address. The global title translation and routing process 47 then determines the address of the next appropriate node 120 in accordance with its routing tables 125, and functioning as a message router, routes the message to the next appropriate node 120.

It is important to note that the global translation process from a pseudo-global title 95 to a true E. 164 destination title 115 is not limited to using the translation table 110. For example, an algorithm could also be used to determine the true E. 164 destination title 115 from the pseudo-global title 95.

It is also important to note that the global title translation and routing process 47 is not limited to substituting the true E. 164 destination title 115 for the pseudo-global title 95. The global title translation and routing process 47 may substitute any other acceptable format for the true destination address for the home network element including, without limitation, E.212, MN, SS7 point code, etc. types of addresses, or any other type of address suitable to permit routing to the terminal's HLR 65.

If required, other nodes in the system (not shown) then route the message in accordance with its intended destination through the international network 55. As shown in FIG. 1, eventually the destination international signaling node 50 receives the message and routes it to the subscriber's HLR 65 based on the true E.164 title 115.

Although described in the context of a satellite communications system, it should be understood that the teachings of this invention may also be practiced in a terrestrial based communications system.

While, for convenience, the pseudo-global title translator 30 has been described as a separate unit, it should be understood that the pseudo-global title translator 30 may also be implemented as software running in the MSC 25.

Although the MIN, ESN, etc., have been described as being stored in the wireless terminal, they could as well be stored in a detachable storage module installed in the wireless terminal.

Thus, while the invention has been particularly shown and described with respect to preferred embodiments thereof, it will be understood by those skilled in the art that changes in form and details may be made therein without departing from the scope and spirit of the invention.

We claim:

1. A method for routing a message through a telecommunications network comprising the steps of:
   receiving an identifying number from a subscriber's wireless terminal;
   prepending at least one character, to said identifying number to form a pseudo-global title, wherein said at least one character is indicative of a location of a translation facility;
   routing a message through said telecommunications network to said translation facility based on said pseudo-global title;
   translating said pseudo-global title to a home location register address upon arrival at said translation facility; and
   routing said message to a home location register having said home location register address.

2. The method of claim 1, wherein said identifying number is a mobile identification number.

3. The method of claim 1, wherein said at least one character comprises at least a portion of a country code.

4. The method of claim 1, wherein said home location register address is an E.164 address.

5. The method of claim 1, wherein said translating is accomplished using a lookup table.

6. The method of claim 1, wherein said translating is accomplished using a conversion algorithm.

7. An apparatus for routing a message through a telecommunications network comprising:
   a mobile switching center for receiving an identifying number from a wireless terminal;
   a unit coupled to said mobile switching center for prepending at least one character to said identifying number to form a pseudo-global title, wherein said at least one character is indicative of a location of a translation facility;
   a first router, coupled to said unit, for routing a message through said telecommunication network to said translation facility based on said pseudo-global title;
   a translator, coupled to said translation facility, for translating said pseudo-global title to a home location register address upon the arrival of said message at said translation facility; and
   a second router, coupled to said translation facility, for routing said message to a home location register having said home location register address.

8. The apparatus of claim 7, wherein said identifying number is a mobile identification number.

9. The apparatus of claim 7, wherein said at least one character comprises at least a portion of a country code.

10. The apparatus of claim 7, wherein said translator translates said pseudo-global title using a lookup table.

11. The apparatus of claim 7, wherein said translator translates said pseudo-global title using a conversion algorithm.

12. The apparatus of claim 7, wherein said home location register address is an E.164 address.

13. A satellite telecommunication network comprising:
    at least one satellite in earth orbit;
    at least one gateway in two-way communication with said satellite and with a terrestrial communication system;
    at least one wireless terminal in two-way communication with said gateway through said satellite wherein said wireless terminal is not a subscriber to said satellite telecommunication network;
    a switching center, coupled to said gateway, for receiving an identifying number from said wireless terminal;
    a unit coupled to said switching center for prepending at least one character to said identifying number to form a pseudo-global title, wherein said at least one character is indicative of a location of a translation facility;
    a first router, coupled to said unit, for routing a message through said satellite telecommunication network to said translation facility based on said pseudo-global title;
    a translator, coupled to said translation facility, for translating said pseudo-global title to a home location register address upon the arrival of said message at said translation facility; and
    a second router, coupled to said translation facility, for routing said message to a home location register having said home location register address.

14. The satellite telecommunication network of claim 13, wherein said identifying number is a mobile identification number.

15. The satellite telecommunication network of claim 13, wherein said at least one character comprises at least a portion of a country code.

16. The satellite telecommunication network of claim 13, wherein said translator translates said pseudo-global title using a lookup table.

17. The satellite telecommunication network of claim 13, wherein said translator translates said pseudo-global title using a conversion algorithm.

18. The satellite telecommunications network of claim 13, wherein said home location register address is an E.164 address.

* * * * *